Figure 1:
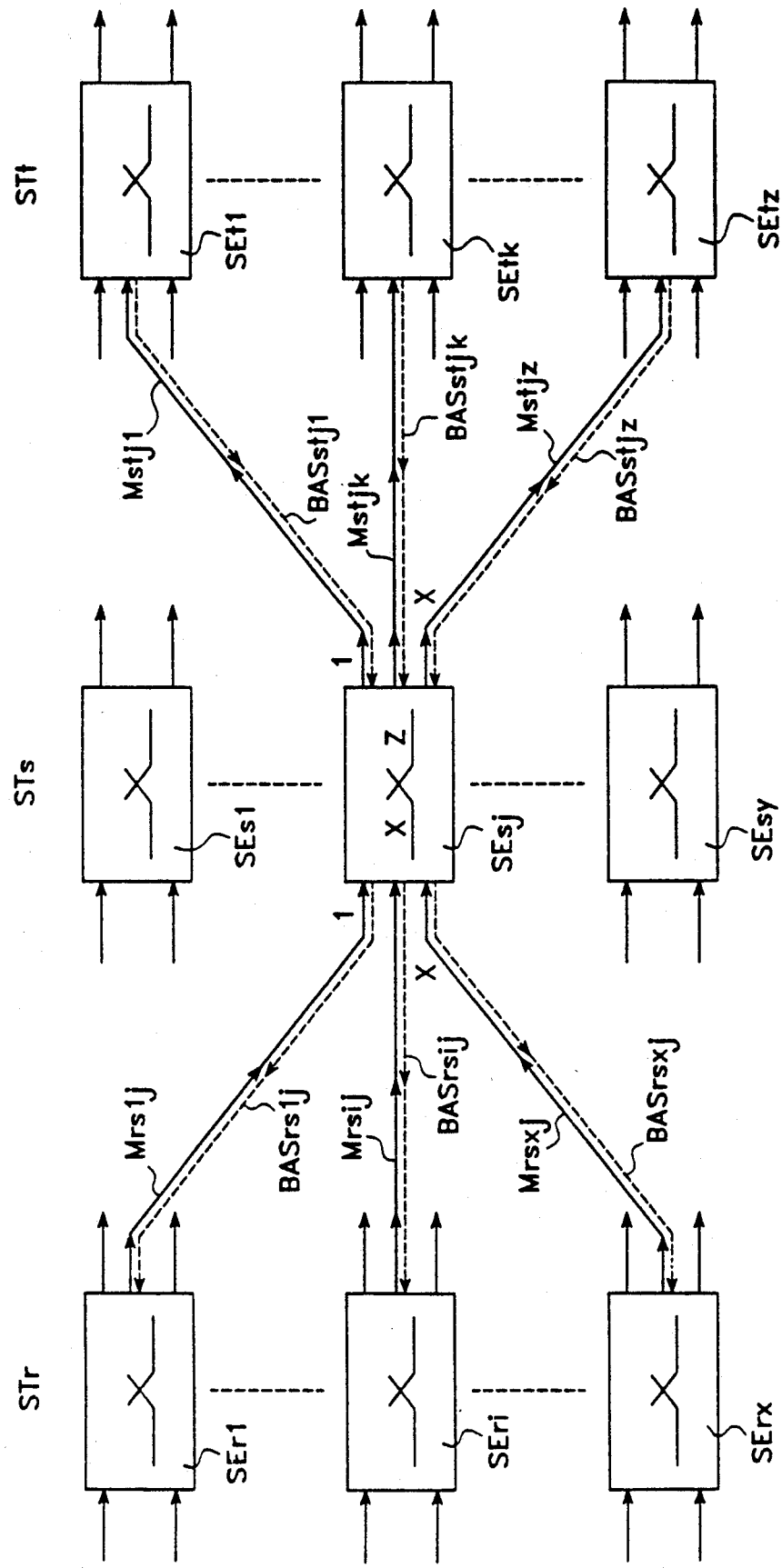

United States Patent [19]
Henrion et al.

[11] Patent Number: 5,247,513
[45] Date of Patent: Sep. 21, 1993

[54] MULTIPLE PATH SELF-ROUTING SWITCHING NETWORK FOR SWITCHING ASYNCHRONOUS TIME-DIVISION MULTIPLEX PACKETS WITH AVAILABILITY SIGNALLING

[75] Inventors: Michel A. Henrion, Zaventem; Henri Verhille, Brecht, both of Belgium

[73] Assignee: Alcatel N.V., Amsterdam, Netherlands

[21] Appl. No.: 703,771

[22] Filed: May 21, 1991

[30] Foreign Application Priority Data

May 22, 1990 [FR] France .................................. 90 06405

[51] Int. Cl.⁵ .......................................... H04L 12/56
[52] U.S. Cl. .................................. 370/60; 370/94.3
[58] Field of Search ............... 370/60, 65, 94.1, 94.3; 340/826

[56] References Cited

U.S. PATENT DOCUMENTS

| | | | |
|---|---|---|---|
| 5,008,878 | 4/1991 | Ahmadi et al. | 370/94.3 |
| 5,020,052 | 5/1991 | DePrycker et al. | 370/60 |

FOREIGN PATENT DOCUMENTS

| | | |
|---|---|---|
| 0224229 | 6/1987 | European Pat. Off. |
| 0234191 | 9/1987 | European Pat. Off. |
| 8502737 | 6/1985 | PCT Int'l Appl. |
| 8700374 | 1/1987 | PCT Int'l Appl. |
| 8907298 | 8/1989 | PCT Int'l Appl. |

OTHER PUBLICATIONS

Turner, "Design of a Broadcast Packet Switching Network", *I.E.E.E. Transactions on Communications*, vol. 36, No. 6, Jun. 1988, pp. 734-743.
U.S. patent application 07/776,337; Henrion et al, filed Dec. 13, 1991.
French Patent Application 90 03 246, filed Mar. 14, 1990.

*Primary Examiner*—Benedict V. Safourek
*Attorney, Agent, or Firm*—Brunell & May

[57] ABSTRACT

A novel packet-oriented multiple path self-routing switching network for switching asynchronous time-division multiplexed packets is characterized in that each switch unit of at least one upstream stage of the switching network includes means for defining an available state in which the downstream switch unit is available for routing packet traffic and for transmitting availability status information to upstream switch units when the downstream switch unit is in that available state, and is further characterized in that each upstream switch unit includes means for receiving availability status information for those outputs leading to a switch unit in the available state, and for prohibiting access to any output for which such availability status information is not received.

18 Claims, 3 Drawing Sheets

MULTIPLE PATH SELF-ROUTING SWITCHING NETWORK FOR SWITCHING ASYNCHRONOUS TIME-DIVISION MULTIPLEX PACKETS WITH AVAILABILITY SIGNALLING

The present invention concerns a multiple path self-routing switching network for switching asynchronous time-division multiplex packets with availability signalling.

In the widest sense, a switching network comprises input ports to which input links are connected, output ports to which output links are connected, switch units disposed between said input ports and said output ports, arranged in one or more stages and interconnected by internal links. The input ports of the switching network are associated with the inputs of switch units of a first stage and the output ports are associated with the outputs of switch units of a final stage. The outputs of the switch units of said first stage are coupled by internal links, possibly by means of intermediary switch unit stages, to the inputs of the switch units of said final stage. Generally speaking, the internal links comprise one or more autonomous links each connecting one output of a switch to one input of another switch or the same switch.

A switching network of this kind is referred to as a multiple path switching network if it offers more than one switch path between any input port and any output port. In this case designating an input port and an output port is not sufficient to determine a path from one to the other. It is also necessary to choose between the multiple paths between this input port and this output port provided by the switching network.

A network of this kind is referred to as a self-routing network, in the widest sense of the term, when a switch path is determined in the switching network with reference not only to routing information containing the implicit or explicit designation of an input port and that of an output port of the switching network but also a routing decision specific to the switching network.

The self-routing facility provided in the switching network therefore provides a self-contained means of solving the routing problem that arises in multiple path networks when the routing is defined only by the designation of an input port and of an output port.

Multiple path switching networks that are self-routing by connection are well known in circuit switching and synchronous time-division multiplex channel switching applications. The routing or connection set-up process is carried out once only, at the start of a call, and determines a switch path whose elements, initially free, are then busied by the call and so become unavailable for other calls. The switchpaths that have been set up therefore introduce a risk of blocking further switch-paths for want of channels. The routing process applied in such prior art switching networks generally encompasses all or a major part of the switching network. One known method uses routing of a call request to the switch units of the switching network, reserving a switch path from the input port to a required output port. If the routing of the call request leads to a dead end, i.e. a switch unit having no available output towards the required output port, an unavailability signal is transmitted in the backward direction by the switch unit and the call request is rerouted from an upstream point via another path, this process being repeated as necessary until the required output port is reached. This complex routing process requires a considerable period of time in terms of basic switching operations to set up the connection but a relatively short time compared with the call duration and therefore does not compromise the connection efficiency of the switching network.

With a method of this kind, the failure of a switch unit, which has similar consequences in respect of unavailability as those described above, is automatically compensated by rerouting call requests from the unavailable switch, so that no calls are lost at set-up time; on the other hand, calls already set up through a switch unit that fails are disrupted or interrupted.

The packets (or "cells") are units of digital information including a label containing information identifying the destination of the packet and call data.

Packets are of fixed or variable length. In the latter case the packet is transferred in the form of an uninterrupted sequence of subpackets with a fixed, relatively short length, which optimizes internal transfer, storage in memory or in registers and processing functions at subpacket level.

In an asynchronous time-division multiplexed packet transmission system the packets of a number of calls transmitted on the same link follow on in any order and packets relating to the same call are transmitted at irregular intervals.

Given the characteristics of asynchronous time-division multiplexed packet transmission, an asynchronous time-division multiplexed packet switching network is usually adapted to switch such packets individually, so that a switch path is determined for each packet, to convey it from an input port of the network to at least one output port. If this switching network is of the self-routing kind, it is referred to as a "packet-oriented self-routing" network.

The connection set-up process carried out beforehand, as just mentioned with reference to circuit switching networks and synchronous time-division multiplex channel switching networks, although in principle applicable to switching asynchronous time-division multiplexed packets, is not used because it would have a number of disadvantages, such as the complexity of management of throughputs of connections set up on each internal link of the network and an excessive time to set up data connections.

For switching asynchronous time-division multiplex packets, attention has therefore turned towards specific switching networks in which the switching process, including path finding, is implemented stage by stage for each individual packet, with no preliminary input port to output port connection set-up and marking stage at the start of the call.

A switching network of this type is described in the article "Design of a Broadcast Packet Network", by J.S. Turner published in the "Proceedings of IEEE INFOCOM'86", Fifth Annual Conference, "Computers and Communications Integration Design, Analysis, Management", pages 668 to 673 (republished in IEEE Transactions on Communications vol 36 no 6 (Jun. 1988) pp 734–743).

A network this kind comprises, from input ports to output ports, stages dedicated to duplicating packets for point-to-multipoint calls, stages dedicated to cross-connecting packets to mix packets from different inputs and obtain mean throughputs per internal link that are equal and stable, insofar as this is statistically possible, and stages dedicated to selected routing to the output ports.

This network is built up from switch units with only two inputs and two outputs. A small buffer for two packets is provided at each input of the switch unit. If a packet is to be routed to an output which is not available, because another packet is being sent to that output, the input can store the packet temporarily. There is no other provision to deal with unavailability or failure of the switch unit even though, because of the packet mixing mentioned above, switch unit unavailability affects a large number of calls.

French patent application FR-90 03246 (which corresponds to commonly assigned copending U.S. application Ser. No. 07/776,337) describes a packet-oriented multiple path self-routing switching network for switching asynchronous time-division multiplexed packets characterized in that each switch of at least one stage of the network has at least three outputs, said outputs being arranged in groups of outputs called routing groups each comprising one or more specific outputs, and in that, on the basis of routing information associated with a fixed or variable length packet received on any input, the switch is adapted to identify a set comprising one or more of said groups of outputs, a copy of the packet being transferred to each of the identified groups of outputs, and to transfer said received packet to a selected output of the outputs of the group or each of the groups of said set.

As in the switching network previously described, no means are described of dealing with the unavailability or failure of a switch unit although this can affect a large number of calls.

The provisions of the circuit switching networks described previously cannot be transposed to packet-oriented multiple path self-routing switching networks for switching asynchronous time-division multiplexed packets because of the complexity that would result in the management of the packet rerouting process in response to unavailability and because of the time it takes for this process.

The present invention provides a solution to this problem whereby no packet is routed to an unavailable or faulty switch unit so that it cannot reach the required output port.

The invention relates to a packet-oriented multiple path self-routing switching network for switching asynchronous time-division multiplexed packets,
comprising:
input ports,
output ports,
switch units arranged in multiple stages of interconnected switch units,
each switch unit having inputs and outputs and being adapted to transfer a packet received on one of its inputs to one or more of its outputs on the basis of routing information associated with said packet,
the input ports of the network representing inputs of switch units of a first stage and output ports of the network representing outputs of switch units of a final stage,
the network being such that,
each switch unit of at least one stage of the network has at least three outputs,
said outputs are arranged in groups of outputs,
a group of output comprises one or more specific outputs,
on the basis of routing data associated with a packet received on any of its inputs, said switch unit is adapted to identify a set comprising one or more of said groups of outputs,
said switch unit is adapted to transfer said received packet to an output selected from the outputs of the single group of said set or to outputs, one per group of said set, each selected from the outputs of the group to which it belongs.

The switching network in accordance with the invention is characterized in that
each switch unit of at least one stage, referred to hereinafter as the stage in question, of the switching network comprises status defining means defining an available state of the switch unit in which the switch unit is available for routing packet traffic,
each switch unit of said stage in question comprises status transmission means associated with the incoming links connecting said switch unit to switch units of the preceding stage and transmitting availability status information to said switch units when the switch unit in question is in said available state,
each switch unit of said preceding stage comprises means for receiving status information associated with the outgoing links connecting said switch unit to switch units of said stage in question and receiving availability status information from said switch units for each of its outputs, if the latter leads to switch unit in said available state, and
each of the switches of said preceding stage comprises defense means contributing to packet routing decisions by prohibiting their access to any output for which the outgoing link does not cause available status information to be received.

Each switch of said preceding stage is therefore informed of the status of the switch units of said stage in question to which it is connected by availability status information associated with each of its outputs. As soon as the status information associated with an output ceases to indicate availability, the switch ceases to send packets to said output. The routing of the packets is modified accordingly and, given that this is a packet-oriented multiple path self-routing switching network, the result is to circumvent the faulty point which then longer affects the transfer of packets in the switching network.

According to another feature of the invention, said status transmission means enable continuous or virtually continuous transmission of a signal representing said available status information.

The circumvention mentioned above is therefore applied virtually immediately, so that the occurrence of a fault has only temporary repercussions on calls already set up.

According to another feature of the invention, following prohibition of routing of packets to a switch unit of said stage in question, the routing of packets to said switch unit resumes as soon as the status information that it provides indicates that it is available again.

According to another feature of the invention, the status of a switch unit of said preceding stage is established by said status defining means by taking into consideration, in addition to the operational status of the switch unit itself, the status information that it receives from switch units of said stage in question, evaluated with reference to groups of outputs, by means of an output group availability supervision circuit which verifies if the routing capacity of each group of outputs is sufficient with reference to a routing capacity threshold.

According to another feature of the invention, said threshold is variable by a command external to the switch unit.

According to another feature of the invention, said threshold specifies, for each group of outputs, a minimum number of available outputs.

According to another feature of the invention, the composition of the groups of outputs is indicated to said output group availability circuit by an external command.

The previous arrangements make it possible to provide a flexible response to received status information at a switch unit irrespective of the configuration of the switching network of which it forms part. A switch unit is declared unavailable only if it no longer has sufficient packet routing capacity in one of its groups of outputs, with reference to parameters that can be modified at any time.

According to another feature of the invention, said status transmission means associated with the incoming links comprise an individual status transmission link for each incoming link.

According to another feature of the invention, said status transmission means associated with the incoming links comprise an individual status transmission link for a group of incoming links belonging to the same internal link between switch units.

In this way the security of status information transmission is respectively established at the level of each individual link or of each group of incoming links belonging to the same internal link.

According to another feature of the invention, each switch unit of said stage in question combines the operating status information on each incoming link with the availability status of the switch unit in question in order to transmit on said individual status transmission link information authorizing transfer of packets on the link in question when the latter is operational and the switch unit in question is available.

As a result, the information authorizing transfer of packets results not only from the correct operational status of a switch unit of said stage in question but also from that of the link (or of the group of incoming links belonging to the same internal link) which leads to it from a switch unit of said preceding stage. As this information is conveyed by transmission means associated individually with the link (or group of links), it is a simple matter to ensure that, in the switch unit of the preceding stage, without compromising security, no conclusion is arrived at as to the unavailability of the outgoing link (or group of outgoing links) unless it is in a position to route packets.

According to another feature of the invention, if the transfer of packets is not authorized, said status information can indicate a status other than the non-available status and then convey, for example, test or command information.

According to another feature of the invention, said status transmission means associated with the links or groups of incoming links comprise a dedicated digital transmission link provided for this purpose.

According to another feature of the invention, if the switching network is symmetrical and two switches of adjacent stages are connected by two symmetrical links, one for each packet transfer direction, said status transmission means associated with the incoming links comprise the transmission of status information in the packets routed on the symmetrical links of the latter.

According to another feature of the invention, at least some of the switch units are switching modules constructed from switch units such that they constitute an assembly equivalent to a larger capacity switch unit, in that said output groups are defined as routing groups of the switching module and in that the means employed to process said status information are centralized at the switching module to receive and transmit said appropriate status information to and from the adjacent stages.

Figure 2:
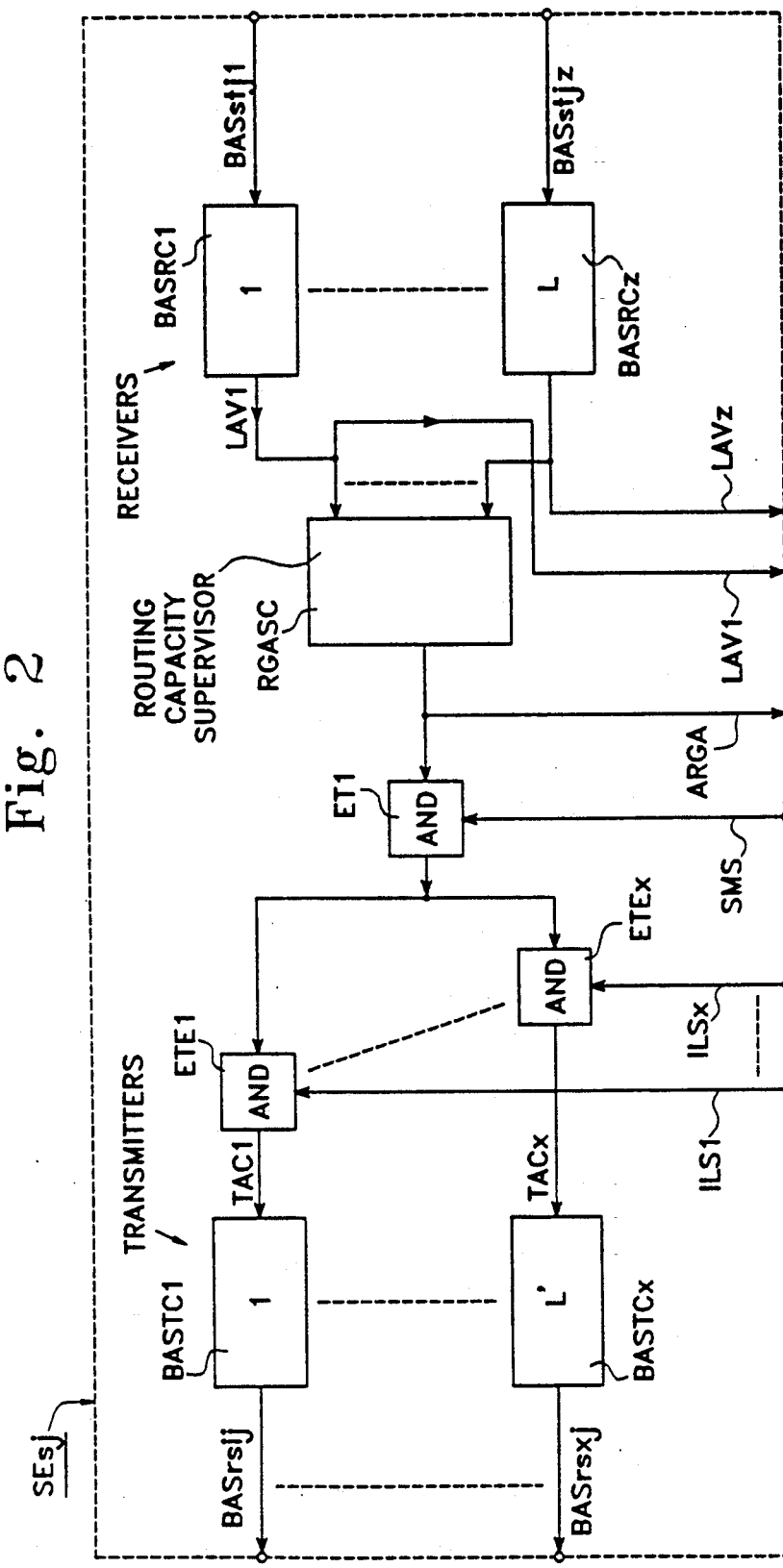
Figure 4:
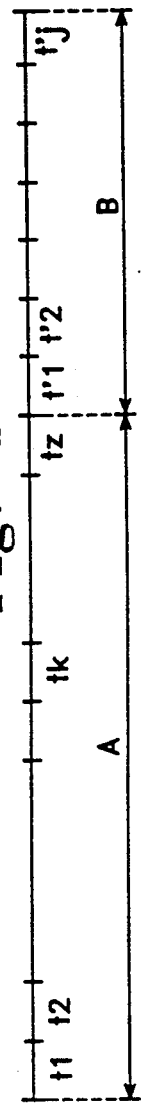
Figure 3:
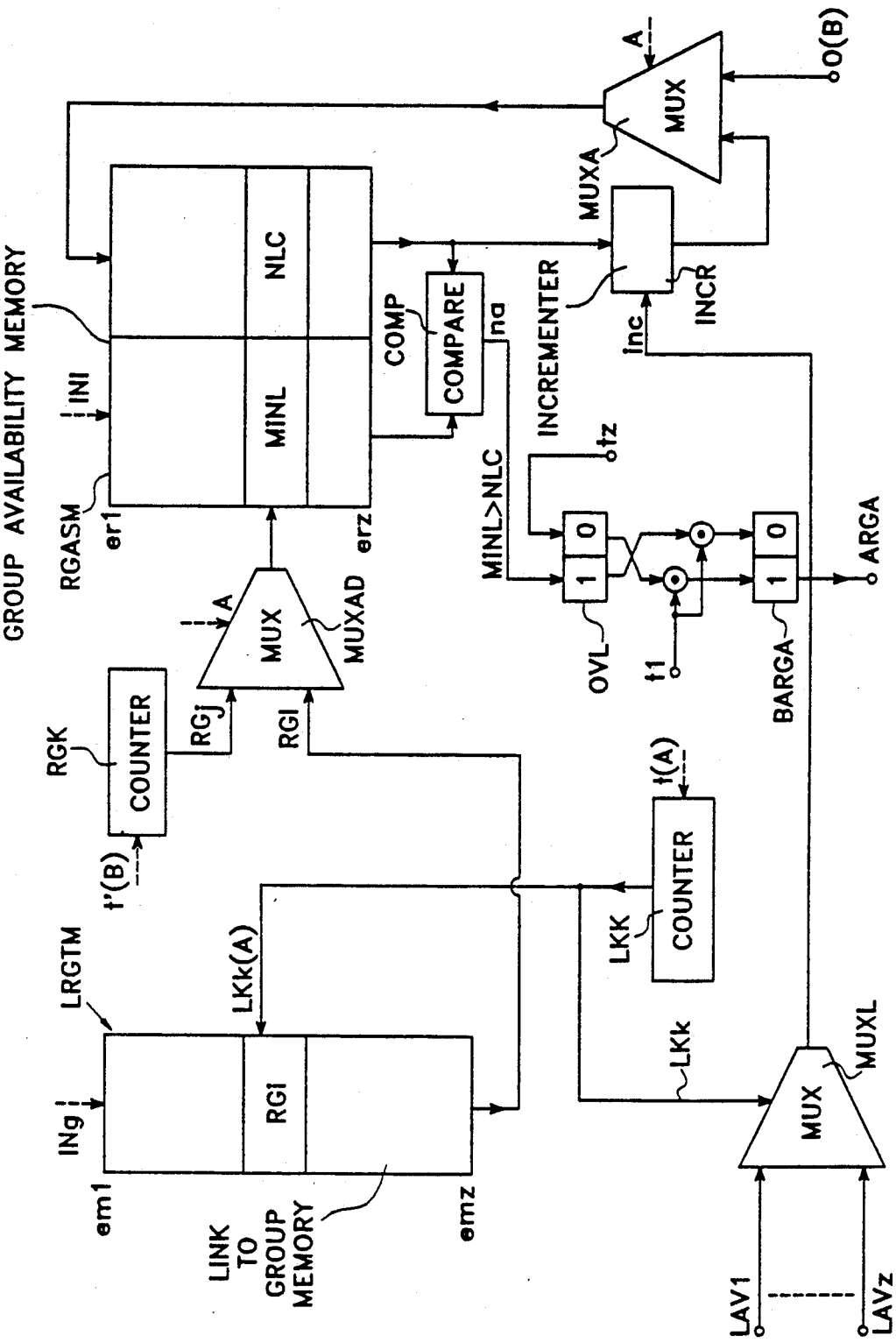

The various objects and characteristics of the invention will be explained in more detail in the following description of one embodiment of the invention given by way of non-limiting example with reference to the accompanying drawings in which:

FIG. 1 is a block diagram of part of switching network showing the transmission of status information in accordance with the invention, FIG. 2 is a block diagram of a device included in accordance with, the invention in a switch unit for establishing and transmitting the status information, FIG. 3 shows a more detailed embodiment of some parts of the device from FIG. 2, FIG. 4 is a timing diagram showing the order in which the various operations are carried out in the FIG. 3 embodiment.

FIG. 1 is a highly schematic representation of part of a switching network with any configuration. This switching network is unidirectional; the invention would apply equally well to a bidirectional network. The network may comprise other stages on its upstream or downstream side.

The part of the network shown in FIG. 1 comprises three stages STr, STs and STt. Each stage comprises a number of switch units: SEr1..., SEri..., SErx... for stage STr, SEs1..., SEsj..., SEsy for stage STs and SEt1..., SEtk..., SEtz for stage STt.

Each switch unit of a stage has inputs and outputs. It routes packets received on its inputs to one or more of its outputs, as explained in the preamble to this description. This is shown with reference to the switch unit SEsj in particular; the same applies to the other switch units.

The switch units are either individual units or switching modules made up of a set of switching units combined to provide a virtual switch unit of greater capacity than the switch units themselves.

As shown here, although this must not be regarded as limiting in any way, the switch unit SEsj is therefore a kind of switching matrix having x inputs to which are individually connected x input internal links Mrs1j..., Mrsij..., Mrsxj shown in full line by which the switch unit is connected to each switch unit of the stage STr. An internal link may comprise multiple independent individual links. In this case, for each of them there is a plurality of individual inputs of the switch unit SEsj. The switch unit also has z outputs to which are individually connected z output internal links Mstj1..., Mstjk..., Mstjz shown in full line by which the switch unit is connected to each of the switch units of the stage STt. An internal link may again comprise a plurality of independent individual links.

The outputs of a switch unit connected to one or more internal links can constitute a group of outputs. A packet received on any input (Mrs1j, for example) is routed to one of the outputs of the selected group, for example a link of the internal link Mstj1.

The invention is directed to the problem arising in a switching network of this kind of the unavailability of any switch unit, the switch unit SEsj, for example.

This switch unit may be unavailable because it is no longer able to route the packets to one of its groups of outputs under satisfactory conditions, this group of outputs consisting of the single internal link Mstj1, for example. Given that in the packet-oriented self-routing asynchronous time-division multiplexed packet switching mode each packet is routed stage by stage, it is not until a packet has reached the switch SEsj that its destination is known. If this packet requires to be routed to the group of outputs regarded as inaccessible, a switch unit SEsj cannot route it satisfactorily. It must therefore be regarded as unavailable in so far as this packet is concerned. However, as the destination of the other packets is not known until they reach the switch units, the invention regards the switch unit as unavailable with respect to them; it is therefore unavailable for any packet and for all its inputs.

The switch unit may also be unavailable because, as the result of any kind of failure detected by conventional means, it is incapable (or is regarded as being incapable) of routing the incoming packets.

Whatever the cause, the overall unavailability of the switch unit is signalled by ceasing to send availability status information to each of the switch units to which its inputs are connected, as shown in FIG. 1 by the dashed lines representing the status transmission links BASrs1j..., BASrsij..., BASrsxj.

The switch unit may be unavailable because it is no longer able to route packets satisfactorily to one of its groups of outputs; this is detected in the switch unit SEsj, in accordance with the invention, through the failure to receive one or more unavailability status information signals transmitted normally, like those transmitted by the switch unit SEsj, by the switch units SEt1..., SEtk..., SETz on the status transmission links BASstj1..., BASstjk..., BASstjz.

The process for establishing and transmitting status information in the switch unit SEsj will be returned to later in this description, in particular in the description referring to FIG. 2.

FIG. 2 shows, by way of example, the circuits in the switch unit SEsj which collect the incoming status information signals BASstj1..., BASstjk..., BASstjz, an active status information signal SMS from the switch unit and individual active status information signals from the incoming links or internal links ILS1..., ILSx to produce each information signal authorizing transfer of packets transmitted on each status transmission link BASrs1j..., BASrsij..., BASrsxj.

Downstream, the information signal authorizing packet transfer is received by appropriate receivers BASRC1..., BASRCz which respond with incoming status signals LAV1..., LAVz. The method of transmitting the packet transfer authorization information signal will not be described. It might quite simply consist in transmitting a digital status signal on a link provided for this purpose, associated individually with each outgoing link. Alternatively, in the case of a symmetrical switching network (that is to say one in which two switch units of adjacent stages are interconnected by two symmetrical internal links, one for each transmission direction) the status information relating to an incoming link or internal link from an adjacent stage switch unit can be transmitted on an outgoing link (symmetrical to the incoming link) to the same adjacent stage switch unit; referring to FIG. 1, it is sufficient to assume in this case that the links shown in dashed line then represent symmetrical links normally used to transfer packets in the opposite direction through the successive stages STt, STs and STr.

A routing capacity supervision logic device RGASC collects the incoming status information and produces an output group availability signal ARGA if, on the basis of criteria to be described with reference to FIG. 3, the groups of outputs are to be considered as available to the incoming packet traffic.

In an AND gate ET1 this information is combined with the active status information SMS and enables the AND gates ETE1 through ETEx if the switch unit is in the normal operating state, which is characterized by the presence of the signal SMS, output by circuits monitoring the operation of the switch unit which will not be described, as constituting standard practice in the art, and if all the groups of output are at this time regarded as available.

Each of the gates EDTE1 through ETEx also receives one of the signals ILS1 through ILSx which characterize individually the correct operating state of the incoming links of the switch unit. As with the signal SMS, the origination of these signals will not be described. The gates ETE1 through ETEx produce signals TAC1 through TACx each of which, relating to one of the incoming links, indicates simultaneously that the switch unit is operational, that the groups of outputs of the switch are regarded as available and that the incoming link in question is operational, which means overall that it can be used to route packets, irrespective of the destination of the packet with reference to the groups of outputs of the switch unit concerned. The respective signals therefore constitutes authorization to transfer packets for an incoming link, that is to say that in so far as it reaches the switch unit of the preceding stage accessing the switch unit SEsj over this link, it therefore constitutes also authorization to transfer packets for the respective outgoing link of this switch unit of the preceding stage.

The signals TAC1 through TACx are applied to outgoing status information transmission circuits BASTC1 through BASTCx which convert these signals into a form appropriate to the mode of transmission of these signals on the status transmission links BASrs1j through BASrsxj each associated with one incoming link of the switch unit SEsj.

The status transmission links can be permanent digital transmission links and the status information signals will be of a continuous nature, both in terms of transmission on the links BASrs1j through BASrxj of the switch unit in question and in terms of reception on the links BASstj1 through BASstjz of the switch unit in question. This will enable virtually instantaneous transmission of any event affecting the capacity of an incoming link to route packets. If, as the result of absence of reception of the availability incoming status signal—or packet transfer authorization—a group of outputs must be regarded as unable to route packets under satisfactory conditions, the supervisory device RGASC eliminates the signal ARGA. The signals BASrs1j through BASrsxj are immediately eliminated on all the status transmission links from the switch SEsj to the preceding stage. Although the switch unit may be capable of routing packets to other groups of outputs, it must be declared unable to route any packets because it is not possible to know in advance to which group of outputs a packet received in the switch unit must be routed. Likewise, if the signal SMS indicates that the switch unit is no longer operational, the signals BASrs1j through BASrsxj are eliminated.

On the other hand, the groups of outputs may be available and the switch unit operational, although a particular incoming link is down. In this case, only the availability status signal associated with this incoming link is eliminated. A provision of this kind in combination with the multiple path self-routing nature of the switching network will make it possible to prevent a localized fault spreading.

Finally, it must be mentioned that the signals LAV1 through LAVz and ARGA are transmitted externally of the FIG. 2 device to a control unit of the switch unit SEsj. This control unit is conventionally adapted not to transmit packets on an outgoing link which does not cause any packet transfer authorization signal to be received. The absence of any of the signals LAB1 through LABz initiates immediate defense measures consisting in modifying the routings so that packets are no longer sent on an outgoing link which is no longer able to route them. Also, the absence of the output group availability signal ARGA can initiate maintenance or fault reporting action.

FIG. 3 shows one embodiment of the routing capacity supervision logical device RGASC from FIG. 2.

As already mentioned, this device receives the signals LAV1 through LAVz and normally provides the signal ARGA. It also receives from a clock (not shown) clock signals shown in FIG. 4 and operating parameters that will be explained later.

As shown in FIG. 4, the clock supplies signals t(A) (t1, t2..., tk..., tz) within basic time periods of a time interval A, each of which corresponds to one of the outgoing links of the switch unit, and signals t'(B) (t'1, t'2..., t'j) in a time interval B, each of which corresponds to one of the groups of outputs of the switch units; this cycle is then repeated.

The signals t(A) are applied to an outgoing link counter LKK. This counter is reset on each clock cycle by conventional means that are not shown.

On each signal t(A) it provides a numerical value designating a different outgoing link of the switch unit. This numerical value LKk is applied to a multiplexer MUXL which accordingly connects one of the incoming status signals LAV1 through LAVz to the input inc of an incrementer circuit INCR.

In the same basic time period, the same numeric value LKk is used as an address to read a memory LRGTM for translating link numbers into output group numbers. The memory locations em1 through emz of the memory LRGTM represent respective outgoing links of the switch unit and each contain the number RGi of a group of outputs to which the outgoing link belongs. The numbers of the groups of outputs contained in the memory LRGTM (which are switching network operating parameters) are written into the memory via an initialization link INg from an operation control unit that is not shown as it does not form any part of the present invention.

The output group number RGI read in the memory is transmitted to one of the two inputs of an address multiplexer MUXAD. This receives from the clock a signal A throughout the time interval A and selects its lower input so that the number RGI serves as an address for reading, still in the same elementary time period, a routing group availability supervision memory RGASM.

The memory locations er1 through erz of the memory RGASM represent respective groups of outputs of the switch unit and each contain two data fields: a field MINL containing a numerical value which is the minimum number of outgoing links that must be available for the group of outputs to be regarded as capable of sustaining the maximum packet traffic load assigned to it with satisfactory performance and a field NLC serving, as will now be explained, as an available outgoing link counter.

The content of the field NLC is applied to the incrementer circuit INCR. If the incoming status information signal selected by the multiplexer MUXL and applied to the input inc indicates that the link in question is available, the incrementer circuit INCR increments by one the content of the field NLC after which the new value obtained is stored in place of the previous value. The operation of writing into the same memory location (the address remaining the same) is suggested in FIG. 3 by the line joining the output of the incrementer circuit INCR to an input of the memory RGASM through a multiplexer MUXA.

The multiplexer MUXA is controlled by the signal A. Before the signal A is present, in other words during the last part of the preceding cycle, its righthand input (as seen in the figure) was selected and enabled a null value (0) to be stored in the NLC field of all locations of the memory RGASM. From the start of the current cycle, the signal A selects its lefthand input (as seen in the figure) so that it passes on the incremented values as just described.

As a result, for each of the outgoing links taken in succession in the basic time periods t1 through tz, the number of the group of outputs to which the outgoing link belongs is read in the memory LRGTM and is used to read in the memory RGASM a value NLC specific to that group of outputs, initially null (0) and incremented if the outgoing link is available. When all the outgoing links of the switch unit have been reviewed in this way, the NLC fields of the memory RGASM each contain the number of links found available in the time interval A.

As a sideline to this, and still in the time interval A, a routing group counter RGK and an overload flip-flop OVL are reset.

At the start of the time interval B, the multiplexers MUXAD and MUXA are reconfigured. The signals t'(B) are applied to the output group counter RGK. This counter was reset during the first part of the current cycle, as already explained.

For each signal t'(B) a numeric value is supplied which designates a different group of outputs of the switch unit. This numeric value RGj is applied to the multiplexer MUXAD which transmits it as an address to the memory RGASM. The memory location of a group of outputs is therefore read and provides the contents of the MINL and NLC fields.

The MINL and NLC values are then applied to the two inputs of a comparator COMP which produces a non-available signal na if MINL>NLC to an overload flip-flop OVL. In this case, the flip-flop OVL goes to logic "1".

A write operation is performed at the same address within the same basic time period. As already explained, this resets the NLC counter field of the group of outputs in question.

When the time interval B ends, the locations of all the groups of outputs have been reviewed and if any of them contains a value NLC less than the value MINL, the OVL flip-flop goes to logic "1". This means that in any of the output groups the number of links available, indicated in the NLC field, has not reached the routing capacity threshold characterized by the value stored in the MINL field.

On the other hand, if the number of available outgoing links is equal to or greater than the MINL threshold, the flip-flop OVL remains at logic "0".

At time t1 of the next cycle of operation, the condition of the overload flip-flop OVL is copied by AND gates commanded by the signal t1 and inverters to a flip-flop BARGA. This flip-flop is therefore set to logic "1" if all the groups of outputs are capable of routing the maximum packet traffic assigned to them. It provides the signal ARGA.

Everything explained above can be generalized to the situation where an availability status signal is associated not with an individual incoming link but with a group of incoming links belonging to the same internal link between switch units. That which applies to a group of incoming links is equally and simultaneously valid for each of the incoming links of the group. Likewise, at the other end of these links, the packet transfer authorization signal will then be valid for all the outgoing links of a group of outgoing links. It has already been mentioned, with reference to FIG. 2, that the invention would apply equally to a symmetrical switching network. In such a network each switch unit may have to transfer packets from a set of inputs to a set of outputs for a first transfer direction and from a second set of inputs to a second set of outputs for the symmetrical transfer direction. It goes without saying that, in this case, a device similar to that of FIGS. 2 and 3 must be provided for each packet transfer direction, these two devices being self-contained but receiving the same active status information SMS.

The FIG. 3 device makes it possible to construct groups of outputs of the switch unit at will, by appropriately initializing the memory LRGTM. It also provides for defining at will the number of links which must be available for the maximum expected packet traffic to be handled under satisfactory conditions, by initializing the MINL field of the locations of the memory RGASM (for reasons of simplification, only the link IN1 has been referred to in this connection). This number can vary from one switch unit to another in the same switching network, depending on the configuration of the network. For the same switch unit of the same switching network, it may vary with time (slack periods, changes to the configuration of the switching network, etc). The effects of failures, particularly when traffic is slight, can be contained by appropriate management of the MINL parameters.

We claim:

1. Packet-oriented multiple path self-routing switching network for switching asynchronous time-division multiplexed packets, comprising:
   a plurality of input ports,
   a plurality of output ports, and
   a plurality of switch unit stages arranged in a sequence from a first stage to a final stage, each of the switch unit stages having a plurality of switch units, with at least one respective outgoing link connecting each switch unit other than the switch units in the final stage to at least one switch into of an adjacent following stage, and with at least one respective incoming link connecting each switch unit other than the switch units in the first stage to at lest one switch unit of an adjacent preceding stage,
   wherein
   each switching unit has inputs and outputs and is adapted to transfer a packet received on one of its inputs to one or more of its outputs on the basis of routing information associated with said packet, the input ports of the network corresponding to inputs of switch units of the first stage and the output ports of the network corresponding to outputs of switch units of the final stage,
   each of the switch units of at lest one stage of the switching network, referred to hereinafter as the downstream switch units, comprises
   at least three outputs arranged in groups of outputs each comprising one or more specific outputs,
   means for identifying, on the basis of routing data associated with a packet received on any of its inputs, a set comprising one or more of said groups of outputs,
   means for transferring said received packet to an output selected from the outputs of the single group of said set or to outputs, one per groups of said set, each selected from the outputs of the group to which it belongs,
   status defining means defining an available state in which said downstream switch unit is available for routing packet traffic to each of said groups of outlets, and
   status transmission means associated with the incoming links connecting said downstream switch unit to the switch units of an adjacent preceding stage, referred to hereinafter as upstream switch units, for transmitting availability status information to said upstream switch units if and only if said downstream switch unit is in said available state, and
   each of said upstream switch units comprises
   status receiving means associated with each of the outgoing links connecting a downstream switch unit to said upstream switch unit, for receiving availability status information if the associated output link leads to a downstream switch unit in said available state, and
   defense means for contributing to packet routing decisions by prohibiting access by the transferring means of said upstream switch unit to any output associated with an outgoing link for which no availability status information is received by the receiving means.

2. Switching network according to claim 1, wherein said status transmission means enables continuous or virtually continuous transmission of a signal representing said available status information.

3. Switching network according to claim 1, wherein, following prohibition, by said defense means of said upstream switch unit, of routing of packets by said transferring means of said upstream switch unit stage to a said downstream switch unit, said transferring means resumes the routing of packets to said downstream switch unit as soon as said availability status information is received from said downstream switch unit.

4. Switching network according to claim 1, wherein the status of an upstream switch unit is established by said status defining means by taking into consideration in addition to the operational status of the switch unit itself, status information that the upstream switch unit receives from downstream switch units, evaluated with reference to groups of outputs, by means of an output group availability supervision circuit which determines a routing capacity for each group of outputs and verifies if the routing capacity thus determined is sufficient with reference to an associated predetermined routing capacity threshold.

5. Switching network according to claim 4, wherein said output group availability supervision circuit uses a command external to the switch unit to determine said threshold.

6. Switching network according to claim 4, wherein said output group availability supervision circuit uses said threshold to determine, for each group of outputs, a minimum number of available outputs.

7. Switching network according to claim 4, wherein the arrangement of the groups of outputs is indicated to said output group availability circuit by an external command.

8. Switching network according to claim 1, wherein said status transmission means associated with the incoming links comprise an individual status transmission link for each incoming link.

9. Switching network according to claim 1, wherein said status transmission means associated with the incoming links comprise an individual status transmission link for a group of incoming links belonging to a same internal link between switch units.

10. Switching network according to claim 8, wherein each downstream switch unit combines operating status information associated with each outgoing link from an upstream switch unit with availability status information associated with the downstream switch in order to transmit on said individual status transmission link information authorizing transfer of packets on the outgoing link from the upstream switch unit when said outgoing link from the upstream switch unit is operational and said downstream switch unit is available.

11. Switching network according to claim 8, wherein each downstream switch unit combines operating status information on each group of outgoing links belonging to the same internal link between switch units with availability status of the upstream switch unit in question, in order to transmit on said individual status transmission link information authorizing the upstream switch unit to transfer packets on the outgoing links when the latter are operational and the downstream switch unit is available.

12. Switching network according to claim 1, wherein, if the transfer of packets is not authorized said status information can indicate a status other than said available status during which test or command information may be conveyed.

13. Switching network according to claim 1, wherein said status transmission means associated with the links or groups of incoming links comprises a dedicated digital transmission link provided for this purpose.

14. Switching network according to claim 1, wherein, the switching network is symmetrical,
two switches of adjacent stages are connected by two symmetrical links, one for each packet transfer direction, and
said status transmission means transmits status information in packets routed over a link associated with the second transfer direction.

15. Switching network according to claim 1, wherein at least some of the switch units are switching modules constructed from an assembly of module-level switch units such that each of the modulus has a capacity larger than that of a module-level switch unit,
said output group are defined as routing groups of the switching module and
the means employed to process said status information are centralized at the switching module to receive and transmit said appropriate status information to and from the adjacent stages.

16. Packet-oriented multiple path self-routing switching network for switching asynchronous time-division multiplexed packets, comprising:
a plurality of input ports,
a plurality of output ports, and
a plurality of switch unit stages arranged in a sequence from a first stage to a final stage, each of the switch unit stages having a plurality of switch units, with at least one respective outgoing link connecting each switch unit other than the switch units in the final stage to at least one switch nit of an adjacent following stage, and with at least one respective incoming link connecting each switch unit other than the switch units in the first stage to at lest one switch unit of an adjacent preceding stage,
wherein
each switching unit has inputs and outputs and is adapted to transfer a packet received on one of its inputs to one or more of its outputs on the basis of routing information associated with said packet,
the input ports of the network corresponding to inputs of switch units of the first stage and the output ports of the network corresponding to outputs of switch units of the final stage,
each of the switch units of at lest one stage of the switching network, referred to hereinafter as the downstream switch units, comprises
at least three outputs arranged in groups of outputs each comprising one or more specific outputs,
means for identifying, on the basis of routing data associated with a packet received on any of its inputs, a set comprising one or more of said groups of outputs, and
means for transferring said received packet to an output selected from the outputs of the single group of said set or to outputs, one per groups of said set, each selected from the outputs of the group to which it belongs,
status defining means defining an available state in which said downstream switch unit is available for routing packet traffic, and
status transmission means associated with the incoming links connecting said downstream switch unit to the switch units of an adjacent preceding stage, referred to hereinafter as upstream switch units, for transmitting availability status information to said upstream switch units if and only if said downstream switch unit is in said available state,
each of said upstream switch units comprises
status receiving means associated with each of the outgoing links connecting a downstream switch unit to said upstream switch unit, for receiving availability status information if the associated output link leads to a downstream switch unit in said available state, and
defense means for contributing to packet routing decisions by prohibiting access by the transferring means of said upstream switch unit to any output associated with an outgoing link for which no availability status information is received by the receiving means, the status transmission means enables continuous or virtually continuous transmission of a signal representing said available status information, following prohibition by said defense means of said upstream switch unit of routing of packets by said transferring means of said upstream switch unit stage to said downstream switch unit, said transferring means resumes the routing of packets to said downstream switch unit as soon as said availability status information is received from said downstream switch unit, the status of an upstream switch unit is established by said status defining means by taking into consideration in addition to the operational status of the switch unit itself, status information that the upstream switch unit receives from downstream switch units, evaluated with reference to groups of outputs, by means of an output group availability supervision circuit which determines a routing capacity for each group of outputs and verifies if the routing capacity thus determined is sufficient with reference to an associated predetermined routing capacity threshold, said threshold is variable by a command external to the switch unit, said threshold specifies, for each group of outputs, a minimum number of available outputs, the arrangement of the groups of outputs is indicated to said output group availability circuit by an external command, if the transfer of packets is not authorized, said status information can indicate a status other than said available status during which test or command information may be conveyed, said status transmission means associated with the links or groups of incoming links comprises a dedicated digital transmission link provided for this purpose, at least some of the switch units are switching modules constructed from an assembly of module-level switch units such that each of the modules has a capacity larger than that of a module-level switch unit, said output groups are defined as routing groups of the switching module, the means employed to process said status information are centralized at the switching module to receive and transmit said appropriate status information to and from the adjacent stages, the switching network is symmetrical, two switches of adjacent stages are connected by two symmetrical links, one for each packet transfer direction, and said status transmission means transmits status information in packets routed over a link associated with the second transfer direction.

17. Switching network according to claim 16, wherein said status transmission means associated with the incoming links comprise an individual status transmission link for each incoming link, and each switch unit of said stage in question combines the operating status information on each combine link with the availability status of the switch unit in question in order to transmit on said individual status transmission link information authorizing transfer of packets on the link in question when the latter is operational and the switch unit in question is available.

18. Switching network according to claim 16, wherein said status transmission means associated with the incoming links comprise an individual status transmission link for a group of incoming links belonging to the same internal link between switch units, and each switch unit of said stage in question combines the operating status information on each combine link with the availability status of the switch unit in question in order to transmit on said individual status transmission link information authorizing transfer of packets on the link in question when the latter is operational and the switch unit in question is available.

* * * * *